United States Patent [19]
Kaley et al.

[11] Patent Number: 5,636,504
[45] Date of Patent: Jun. 10, 1997

[54] HANDLE ASSEMBLY FOR OUTDOOR POWER EQUIPMENT

[75] Inventors: Charles F. Kaley, Bloomington; Larry W. Schmidt, Farmington; Philip G. Stalpes, Hamel, all of Minn.

[73] Assignee: The Toro Company

[21] Appl. No.: 491,206

[22] Filed: Jun. 16, 1995

[51] Int. Cl.⁶ .......................... A01D 34/67; B62B 5/06
[52] U.S. Cl. ..................... 56/1; 56/16.7; 56/DIG. 18; 16/111 A
[58] Field of Search ............... 56/1, 2, 16.7, DIG. 18; 16/111 A; 403/93

[56] References Cited

U.S. PATENT DOCUMENTS

| | | |
|---|---|---|
| 2,727,753 | 12/1955 | Johnson et al. . |
| 3,357,716 | 12/1967 | Musichuk . |
| 3,481,123 | 12/1969 | Lessig . |
| 3,527,469 | 9/1970 | Gobin . |
| 3,604,187 | 9/1971 | Weber ........................ 56/249 |
| 3,694,855 | 10/1972 | Meyer et al. ............. 16/111 A |
| 3,855,763 | 12/1974 | Seifert et al. ......... 56/DIG. 18 X |
| 4,561,239 | 12/1985 | Cook ........................ 16/111 A X |
| 4,976,455 | 12/1990 | Brammer, Sr. ............ 403/93 X |
| 5,261,215 | 11/1993 | Hartz et al. . |

Primary Examiner—Terry Lee Melius
Attorney, Agent, or Firm—James W. Miller

[57] ABSTRACT

A U-shaped handle assembly for an outdoor power equipment unit, such as a lawn mower, comprises two, transversely spaced, upwardly extending handle tubes which are pivotally connected to the housing of the unit adjacent their lower ends. A pair of handle retention brackets mounted on the housing of the unit coact with the handle tube lower ends to define a plurality of adjusted positions of the handle assembly on the unit. These positions comprise a first adjusted position in which the handle assembly is locked to define a normal operational position of the handle assembly, a second adjusted position in which the handle is held by a detent to define a storage position extending vertically upwardly from the housing, and a third adjusted potion in which the handle is held by abutment with a shoulder to define an additional storage position in which the handle assembly extends forwardly on the housing. The handle assembly can be released from its first adjusted position by releasing a single locking mechanism between one of the handle tubes and a first handle retention bracket with the other handle tube then being able to cam its way out of its handle retention bracket during forward rotation of the handle assembly.

24 Claims, 3 Drawing Sheets

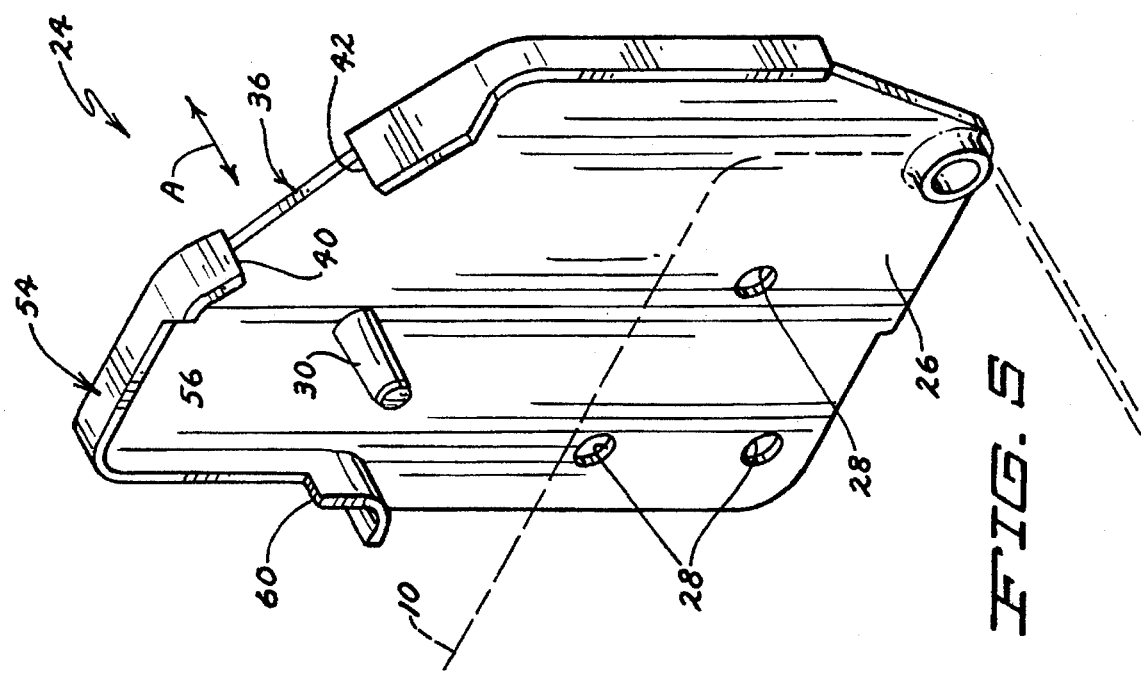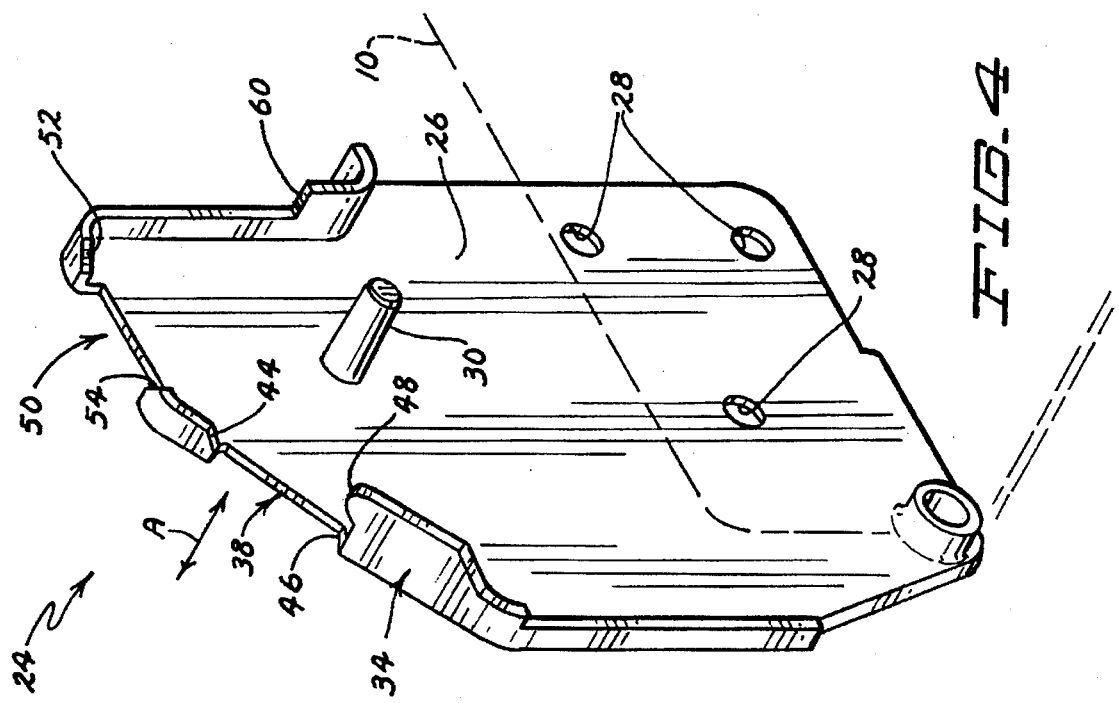

HANDLE ASSEMBLY FOR OUTDOOR POWER EQUIPMENT

TECHNICAL FIELD

This invention relates to an outdoor power equipment unit, such as a lawn mower, having an adjustable handle assembly which the operator holds to guide the unit.

BACKGROUND OF THE INVENTION

Rotary lawn mowers are known which comprise a wheeled housing, a rigid cutting blade rotatable in a cutting chamber in the housing, and a generally U-shaped handle assembly extending upwardly and rearwardly from the housing for allowing an operator to guide and manipulate the mower. The handle assembly generally includes two, transversely spaced handle tubes joined together at their upper ends by a cross tube forming a hand grip portion of the handle assembly. Desirably, the handle assembly is normally substantially rigid or locked to the housing during normal operation of the mower to allow the user to apply force to the mower through the handle assembly. However, in this normal operational position, the handle assembly, which is quite long, extends substantially rearwardly beyond the mower housing. Thus, the mower takes up considerable room in the garage or other storage location when it is not in use and the handle assembly remains in its normal operational position.

Mowers are known in which the handle assembly can be folded up relative to the housing for storage purposes. Such a foldable handle assembly is usually pivoted adjacent its lower end to the mower housing and is formed in two sections, a lower section and an upper section. Some type of locking means is provided for holding the handle assembly in its normal operational position. However, this locking means can be manually released, the handle assembly can be pivoted relative to the housing until the lower section thereof substantially overlies the housing, and then the upper section of the handle assembly can be folded back over the lower section. U.S. Pat. No. 3,527,469 shows such a foldable handle assembly including means for locking the handle assembly in its normal operational position.

The locking means typically used in adjustable handle assemblies of this general type function by locking both of the handle tubes of the handle assembly relative to the mower deck. If only one handle tube were locked, the handle assembly would twist when the operator pushed on it because the unlocked handle tube could rotate forwardly on the housing relative to the locked handle tube. To avoid this, most mowers and other similar pieces of outdoor power equipment lock or restrain both of the handle tubes so that they remain aligned with one another during use to avoid having the handle assembly twist when the user pushes on it.

However, when it comes time to move the handle assembly out of its normal operational position, the user has to unlock both handle tubes to allow the handle assembly to be rotated out of its normal operational position. Since the locking means is usually at the base of the handle assembly near the spot where the lower ends of the handle tubes connect to the housing, it involves bending down, or getting on one's knees, to manipulate the locking means on both sides of the mower housing to unlatch or release them. This is inconvenient to do. In addition, some operators will forget that both handle tubes need to be unlatched before the handle assembly can be rotated. Thus, such operators may have difficulty in unlatching the handle assembly.

Foldable handle assemblies of the type described above generally have two adjusted positions on the housing, the normal operational position thereof and the fully folded position. It is inconvenient to place the handle assembly into its fully folded position every time the operator is done mowing due to the work required to unlatch the handle assembly, to pivot it forwardly, to loosen the upper and lower sections of the handle assembly, and to then fold the upper section of the handle assembly back over the lower section. It is also necessary to reverse this process before the next use of the mower to place the handle assembly back in its operational position. Thus, as a practical matter, the fully folded position is most often used only for long term storage of the mower over the winter. During the mowing season, many operators simply keep the handle assembly in its normal operational position without bothering to fold it up after each use.

Some mowers are known in which the handle assembly can be moved from its normal operational position to a generally vertical position overlying the rear of the mower deck. This decreases the effective area occupied by the mower to enhance short term storage without requiring that the handle assembly be completely folded up. However, this generally vertical position of the handle assembly is not well suited for long term storage as the upwardly extending handle assembly intrudes into space that might normally be needed for the winter storage of various other items or objects.

SUMMARY OF THE INVENTION

It is one aspect of this invention to provide a handle assembly for an outdoor power equipment unit, such as a lawn mower, which can be quickly and easily released from an operational position thereof, and which conveniently forms a plurality of storage positions.

One aspect of this invention is provided in an outdoor power equipment unit having a housing suited for movement over the ground. A handle assembly extends upwardly from the housing to allow an operator to hold the handle assembly and thereby guide the housing during its movement over the ground, the handle assembly including two transversely spaced, upwardly extending handle tubes. A means is provided for pivotally attaching the handle tubes to the housing such that the handle assembly can be rotated on the housing to adjust its position relative to the housing. A locking mechanism coacts between the housing and one of the handle tubes when the handle assembly is in a first adjusted position on the housing. The locking mechanism has a first engaged position and a second disengaged position, wherein the locking mechanism precludes rotation of the handle assembly out of its first adjusted position in its first engaged position but allows rotation of the handle assembly out of its first adjusted position in its second disengaged position. The locking mechanism is selectively operable by the operator to place the locking mechanism in its second disengaged position and thereby free the handle assembly for rotation. A detent coacts between the housing and the other handle tube when the handle assembly is in its first adjusted position. The detent is shaped to be overcome simply by rotating the handle assembly after the locking mechanism is first placed in its second disengaged position by the operator.

Another aspect of this invention is provided in an outdoor power equipment unit having a housing suited for movement over the ground. A handle assembly extends upwardly from the housing and is pivotally attached to the housing such that the handle assembly can be rotated on the housing to adjust its position relative to the housing. A means is carried on the housing and coacts with the handle assembly for establishing the various adjusted positions of the handle assembly relative to the housing. These positions include a first operational position in which the handle assembly extends upwardly and rearwardly relative to the housing, the position defining means including means for locking the handle assembly in its first operational position, a second storage position of the handle assembly in which the handle assembly extends generally vertically relative to and overlies the housing, the position defining means including means for holding the handle assembly in a detented fashion while in its second storage position, and a third storage position in which the handle assembly extends forwardly relative to the housing and overlies the housing in a folded configuration of the handle assembly, the position defining means including abutment means against which the handle assembly rests while in its second storage position.

BRIEF DESCRIPTION OF THE DRAWINGS

This invention will be described hereafter in the Detailed Description, taken in conjunction with the following drawings, in which like reference numerals refer to like elements or parts throughout.

FIG. 4 is a perspective view of a first handle retention bracket which coacts with a portion of one of the handle tubes of the handle assembly shown in FIG. 1 for maintaining the handle assembly in the various adjusted positions thereof;

FIG. 5 is a perspective view of a second handle retention bracket which coacts with a portion of the other handle tube of the handle assembly shown in FIG. 1 for maintaining the handle assembly in the various adjusted positions thereof.

DETAILED DESCRIPTION

Figure 1:
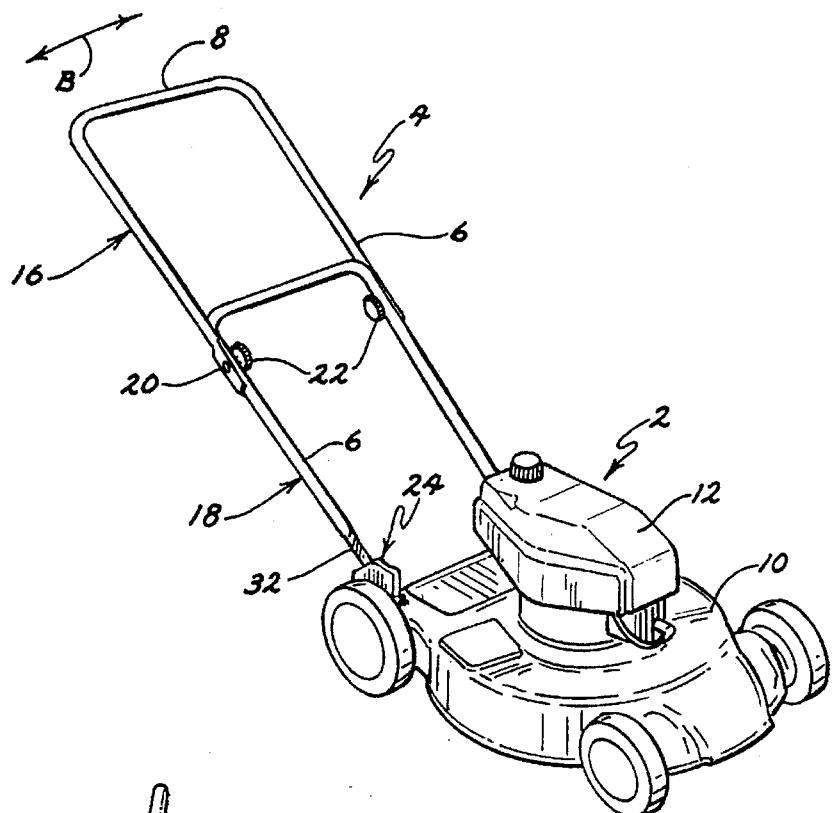
FIG. 1 is a perspective view of an outdoor power equipment unit equipped with the handle assembly of this invention, the handle assembly being shown in its normal operational position extending rearwardly from the housing of the outdoor power equipment unit.

Referring to FIG. 1, a handle assembly of an outdoor power equipment unit 2 is generally indicated as 4. Handle assembly 4 is generally U-shaped having two upwardly extending handle tubes 6 joined together at their upper ends by a cross rod 8. The operator holds onto cross rod 8, which thus forms a hand grip, to guide outdoor power equipment unit 2 during operation thereof.

Outdoor power equipment unit 2 on which handle assembly 4 is used preferably comprises a lawn mower. More specifically, the lawn mower comprises a wheeled housing 10 suited for movement over the ground, a rotatable cutting element (not shown) carried in a cutting chamber in the housing for severing grass or other vegetation at a predetermined height above the ground, and a motor means 12 for operating the cutting element. Typically, the rotatable cutting element comprises a rigid steel blade. Handle tubes 6 of handle assembly 4 connect at their lower ends to housing 10 of the lawn mower and form, in effect, a part of the lawn mower. Any conventional lawn mower or other similar outdoor power equipment unit of the walk-behind type may be used in conjunction with handle assembly 4.

Figure 3:
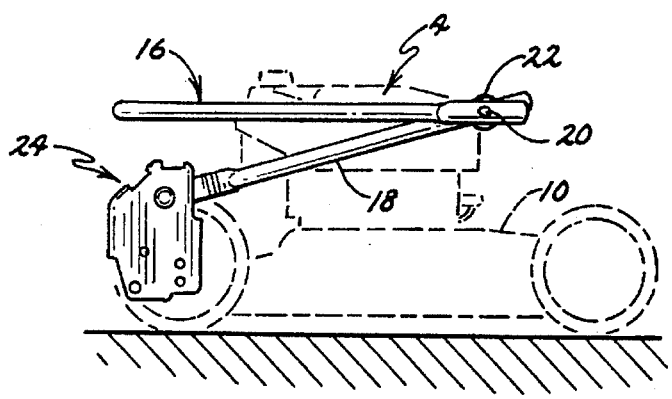
FIG. 3 is a side elevational view of the outdoor power equipment unit shown in FIG. 1, the handle assembly being shown in a fully folded, generally horizontal storage position overlying the housing of the outdoor power equipment unit.
Figure 8:
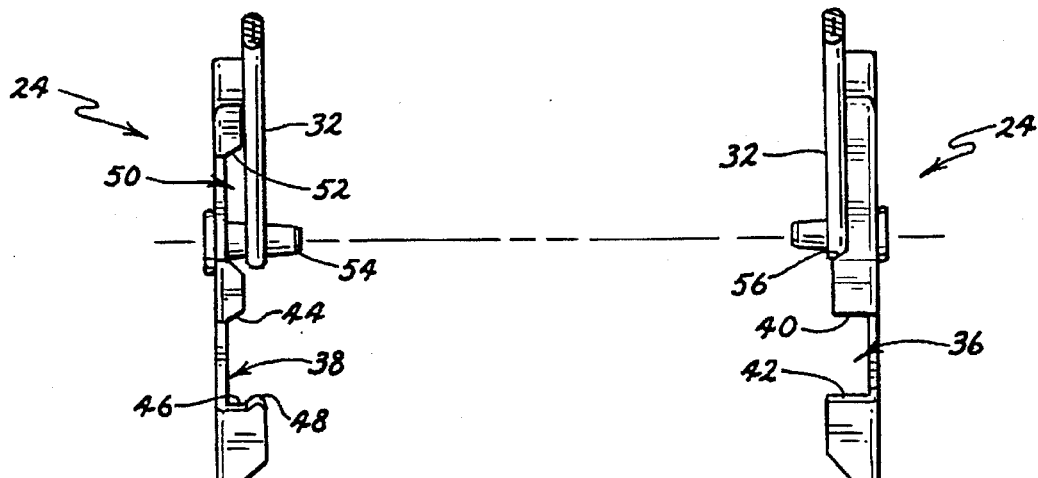
FIGS. 6–8 are cross-sectional views taken through the handle assembly immediately above the handle retention brackets shown in FIGS. 4 and 5, particularly illustrating the coaction of the handle tubes and the brackets in each of the adjusted positions of the handle assembly shown in FIGS. 1–3, respectively.

Handle assembly 4 is formed in two separate upper and lower sections 16 and 18 which are pivotally joined together by pivot pins 20. A threaded knob 22 is received on a threaded inner end of each pivot pin 20 to allow knobs 22 to be tightened thereon so as to secure or affix the two sections 16 and 18 together to act as a unitary handle assembly. However, when knobs 22 are loosened relative to one another, upper section 16 of handle assembly 4 can be folded over lower section 18 generally as illustrated in FIG. 3.

Two transversely spaced, handle retention brackets 24 are mounted on the rear end of housing 10 with one bracket 24 being located along each side of housing 10. Each bracket 24 includes a generally planar wall 26 having a plurality of openings 28 in the lower portion thereof. Conventional fasteners (not shown), such as machine bolts, can pass through such openings 28 to affix bracket 24 to mower housing 10. When so affixed, the planar wall 26 of each bracket 24 includes an upper portion that extends for a short distance above the upper surface of housing 10.

Preferably, brackets 24 are made or stamped from a metallic material and have some degree of resilience or flex relative to one another. In other words, the upper portion of each bracket can slightly flex from side to side towards and away from one another as indicated by the arrows A in FIGS. 4 and 5. This flex can be provided by having the upper portions of each bracket flex relative to housing 10 or by having brackets 24 be rigid with housing 10 with housing 10 itself being slightly flexible across its width.

The upper portion of each bracket includes a stub shaft 30 that serves as a pivot point for the lower ends of one handle tube 6 of handle assembly 4. Brackets 24 are generally longitudinally aligned with one another on housing 10 such that the stub shafts 30 lie along the same pivot axis. Handle tubes 6 are preferably tubular in shape, but the lower ends 32 thereof are flattened to have a generally flat cross-sectional shape. Flattened lower ends 32 of handle tubes 6 are each provided with an opening that receives one stub shaft 30 to rotatably journal handle assembly 4 on housing 10. Thus, handle assembly 4 may be rotated in a fore and aft direction on housing 10 as indicated by the arrows B in FIG. 1.

The upper portion of each bracket 24 further includes an inwardly facing edge or lip 34 with lips 34 on the spaced brackets 24 facing towards one another. Each such lip 34 is positioned to be proximate to one side of that handle tube 6 which is pivotally journalled on that bracket. Thus, as handle assembly 4 is rotated on housing 10, flattened lower end 32 of each handle tube 6 will trace an arc that passes along and in close proximity to lip 34. Handle tubes 6 in this type of handle assembly are typically under some tension that bias handle tubes 6 outwardly relative to one another. This outward bias on handle tubes 6 keeps flattened lower ends 32 of handle tubes 6 abutted up against the inwardly facing lips 34 on handle retention brackets 24.

Figure 2:
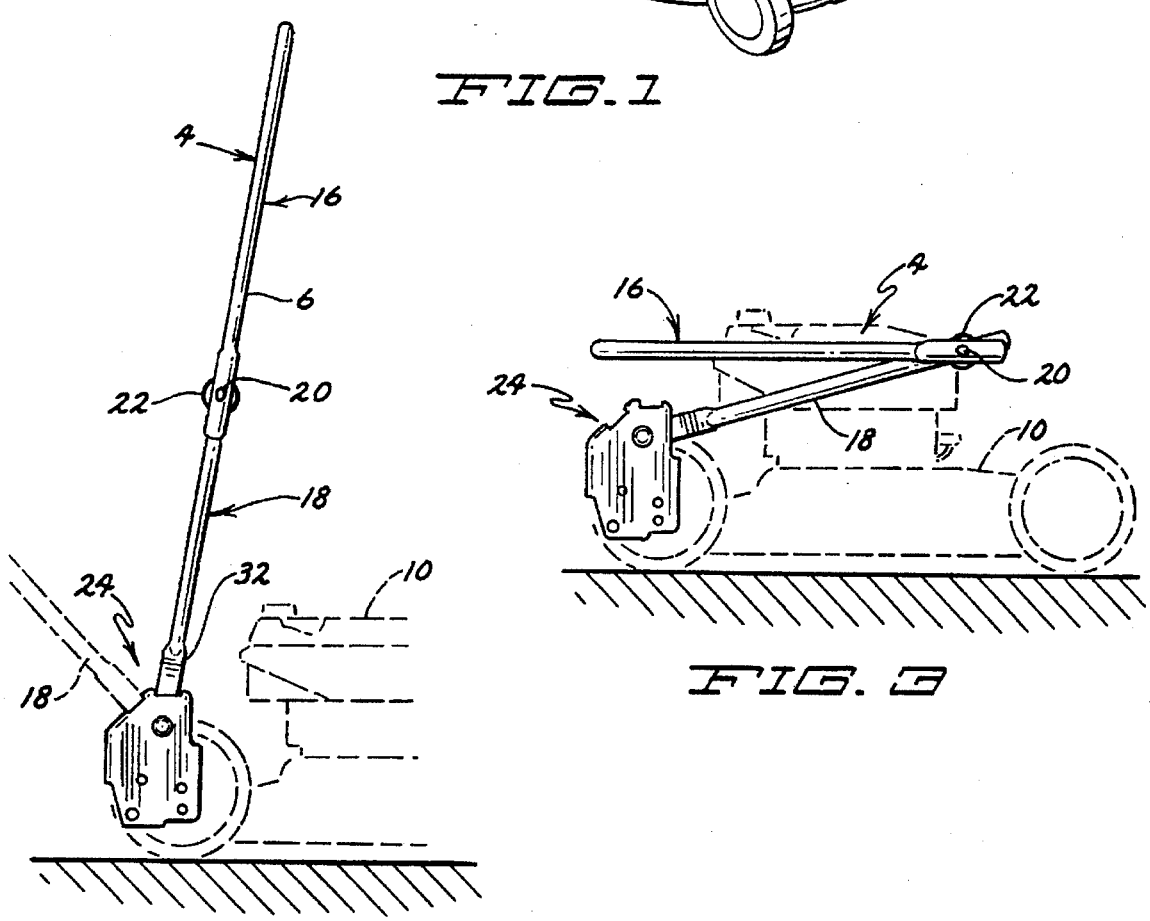
FIG. 2 is a side elevational view of the outdoor power equipment unit shown in FIG. 1, the handle assembly being shown in a fully extended, generally vertical storage position overlying the housing of the outdoor power equipment unit.

Brackets 24 and their coaction with handle tubes 6 forms a means for defining a plurality of adjusted positions of handle assembly 4 relative to housing 10. The first adjusted position, which is the normal operational position of handle assembly 4, is one in which handle assembly 4 extends upwardly and rearwardly from housing 10, as shown in FIG. 1. The second adjusted position, which is used during mower storage, is one in which handle assembly 4 extends generally vertically upwardly from housing 10 to overlie housing 10, as shown in FIG. 2. The third adjusted position, which is also used during mower storage, is one in which handle assembly 4 extends forwardly relative to the mower deck and generally horizontally to allow handle assembly 4 to be folded up, as shown in FIG. 3.

It is necessary to lock handle assembly 4 in its first adjusted position, i.e. the normal operational position. Thus, when the operator pushes on handle assembly 4, he or she does not merely rotate handle assembly 4 freely on housing 10 but can effectively use it to apply force to housing 10 to push on or guide housing 10. In this regard, inwardly facing lips 34 of handle retention brackets 24 are formed with a first set of longitudinally aligned and inwardly facing recesses 36, 38 which are shaped to receive therein flattened lower ends 32 of handle tubes 6. Each recess 36, 38 provides some degree of restraint, though not identical degrees of restraint as will be described below, for its associated handle tube 6. Thus, both handle tubes 6 are held in place in the first adjusted position as is desirable in a handle assembly 4 of this type.

The recesses 36, 38 provided in the first set thereof are not identically shaped. One recess 36 is formed to provide a positive locking mechanism with one handle tube 6 by virtue of having forward and rearward edges 40, 42 both of which are perpendicular to lip 34 and thus perpendicular to flattened lower end 32 of handle tube 6. The other recess 38, on the other hand, is formed to provide a simple detent against rotation of handle assembly 4 out of its first adjusted position. This is done by having the forward edge 44 of recess 38 extend angularly or non-perpendicularly with respect to lip 34 and flattened lower end 32 of handle tube 6 to form, in effect, a cam surface.

Figure 6:
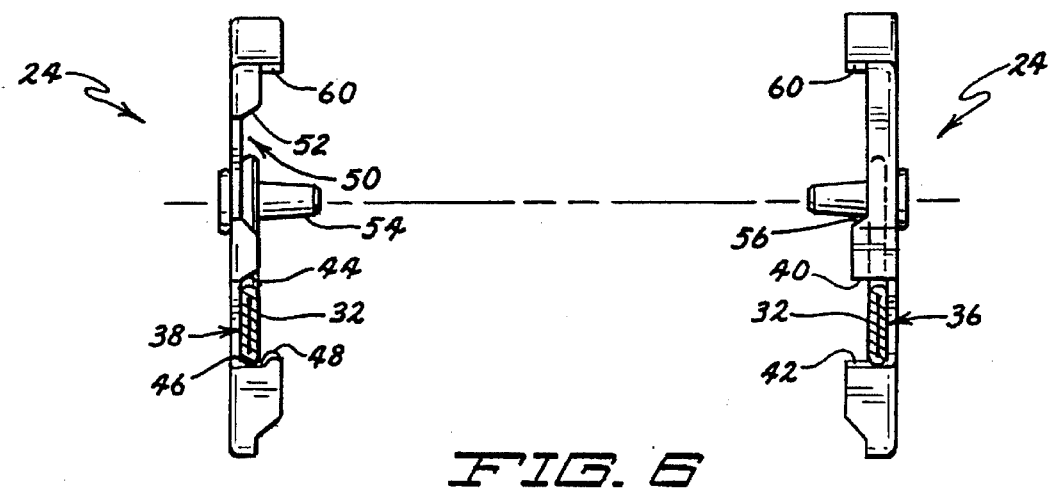

FIG. 6 illustrates handle assembly 4 when flattened lower ends 32 of handle tubes 6 are located within recesses 36, 38 in the first set thereof, thus holding handle assembly 4 in its first adjusted position. In this position, a forward push on handle assembly 4 will not overcome the positive locking action provided by first recess 36 and its coaction with its associated handle tube 6. For that matter, a rearward pull on handle assembly 4 will also not overcome the positive locking action provided by first recess 36 due to the perpendicular nature of the rearward edge 42 of first recess 36. In fact, the rearward edge 46 of the other recess 38 is also formed perpendicularly, and includes a small rounded protrusion 48 as well, to also positively lock handle assembly 4 against any rearward rotation from the first adjusted position. Thus, handle assembly 4 is normally held or locked in its first adjusted position.

If the operator wishes to free handle assembly 4 for forward rotation out of the first adjusted position, he can do so simply by pushing on flattened lower end 32 of handle tube 6 received in first recess 36 to physically disengage that flattened lower end from first recess 36. This inward push is represented by the arrow C in FIG. 7 and by the phantom line position of flattened lower end 32 of handle tube 6 which shows such flattened lower end having been moved inwardly to clear the forward edge 40 of first recess 36. This inward movement is allowed because handle tubes 6 can be pushed sufficiently inwardly towards one another against the normal outward bias that exists between them to allow flattened lower end 32 of handle tube 6 to clear first recess 36. Thus, first recess 36 and flattened lower end 32 of handle tube 6 and their coaction together form a positive locking mechanism having a first engaged position as shown in the solid line illustration thereof in FIG. 6 and a second disengaged position as shown in the phantom line illustration thereof in FIG. 7.

Once the operator has manually disengaged the one handle tube from first recess 36 in the manner just described, the operator can immediately rotate handle tube 6 forwardly relative to housing 10 without having to physically manipulate or push on flattened lower end 32 of the other handle tube 6. Remember that a simple detent is formed by other recess 38 and flattened lower end 32 of its associated handle tube. As forward rotation of handle assembly 4 occurs, flattened lower end 32 of handle tube 6 engages against the inclined cam surface forming the forward edge 44 of other recess 38. This will cause flattened lower end 32 of handle tube 6 to deflect or move slightly inwardly and may also flex the upper portion of bracket 24 slightly outwardly simultaneously to allow flattened lower end 32 to simply slip out of recess 38 solely by virtue of the forward rotation of handle assembly 4.

Thus, the operator of outdoor power equipment unit 2 can more easily release handle assembly 4 for movement from its normal operational position forwardly towards one of its two storage positions simply by releasing only one handle tube 6 from first recess 36. The other handle tube 6 releases itself as it pops out of the detent formed by second recess 38 during forward rotation of handle assembly 4. Thus, handle assembly 4 can be more quickly and easily released than prior art handle assemblies in which positive locks hold both of handle tubes 6 in place. Nonetheless, both handle tubes 6 are restrained in place in the first adjusted position of handle assembly 4.

Figure 7:
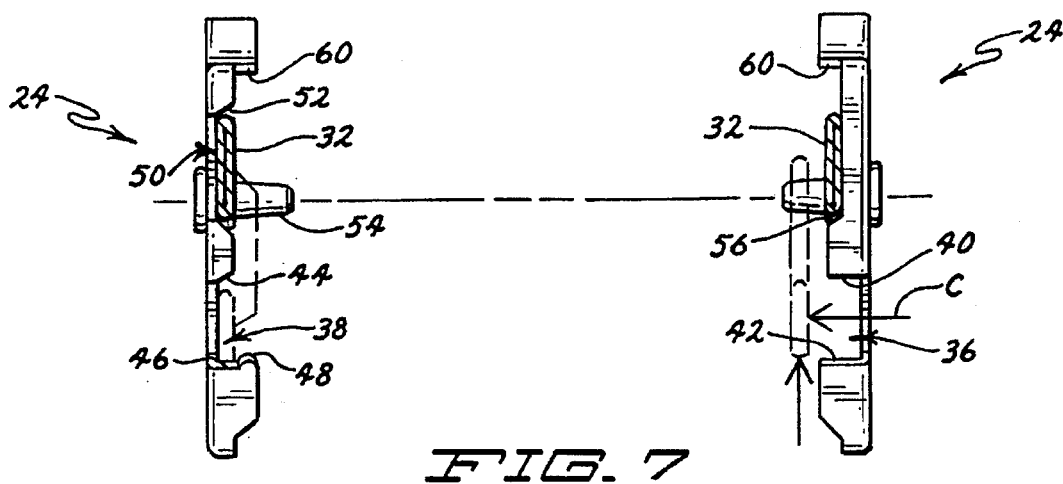

Once handle assembly 4 is released from its first adjusted position, it can be pushed or rotated forwardly until it reaches its second adjusted position shown in FIG. 2, namely that position where it is generally vertical to and extends above housing 10. Handle retention brackets 24 include additional means for holding handle assembly 4 in a detented manner in this second adjusted position. This means includes at least one additional, inwardly facing recess 50 on at least one retention bracket 24, said additional recess 50 being offset forwardly along lip 34 from the first pair of recesses 36, 38. As shown in FIG. 7, additional recess 50 is formed to have inclined forward and rearward edges 52 and 54 shaped much like the inclined forward edge 44 of second recess 38 in the first pair. Thus, the inclined forward and rearward edges 52 and 54 of additional recess 50 will form cam surfaces with flattened lower end 32 of the associated handle tube 6 to form a detent that can be overcome in both directions of rotation of handle assembly 4.

If handle assembly 4 is placed in its second adjusted position, at least one handle tube 6 is received within additional recess 50. The engagement therebetween is sufficient to hold handle assembly 4 in its second adjusted position, particularly since this is a storage position in which no substantial force is being exerted on handle assembly 4 by the operator. If the operator wishes to reset handle assembly 4 to its first adjusted position, he can easily do so by pulling rearwardly on handle assembly 4 with flattened lower end 32 of handle tube 6 simply camming itself out of additional recess 50 back past the inclined rearward edge 54 of additional recess 50. A similar inclined rearward edge 56 is used on lip 34 of the other bracket 24 with flattened lower end 32 of the other handle tube 6 camming itself back past this edge 56 in the same manner.

Similarly, handle assembly 4 can also be rotated forwardly out of its second adjusted position to be able to move on towards its third adjusted position. Again the forward edge 52 of additional recess 50 is inclined similarly to that of its rearward edge 54, and handle tube 6 can cam itself past forward edge 52 in the manner previously described. No similar forward edge is used on the other bracket 24, but none is required as the two handle tubes 6 move conjointly with one another. Thus, the detent formed by additional recess 50 with one handle tube 6 is sufficient to hold both handle tubes 6 in the second adjusted position of handle assembly 4.

After handle tubes 6 pass out of the second adjusted position, they can continue towards the third adjusted position in which they extend forwardly and generally horizontally relative to housing 10 to allow them to be folded up and overlie housing 10. In this regard, each lip 34 on each bracket 24 terminates in a horizontal, upwardly facing shoulder 60 that is located at a forward portion of bracket 24 forwardly of stub shaft 30. This shoulder 60 forms an abutment on which the forward side of flattened lower end 32 of each handle tube 6 can rest when it reaches its third adjusted position to be retained therein. After handle assembly 4 reaches such third adjusted position, upper section 16 of handle assembly 4 can be loosened relative to lower section 18 thereof to be folded back over the forwardly extending lower section 18.

Handle assembly 4 of this invention has numerous advantages over known prior art handle assemblies. First, it is locked in a first adjusted position, i.e. the normal operational position thereof, with both handle tubes 6 being restrained against rotation by the first pair of recesses 36, 38. However, it can be unlocked from such position by the manipulation of only one handle tube 6 relative to recess 36 to unlock such handle tube with the other handle tube simply being released from its recess 38 during forward rotation of handle assembly 4. Thus, the operator has to unlock only one locking mechanism on one handle tube 6 and not two separate locking mechanisms.

In addition, handle retention brackets 24 and their coaction with handle tubes 6 form a means for easily and simply defining a plurality of additional adjusted positions in addition to the normal operational position. An intermediate storage position is formed with handle assembly 4 extending vertically relative to housing 10 with handle assembly 4 being detented or held in place in this second adjusted position against rotation either further forwardly or back rearwardly. Yet, handle assembly 4 can be easily released from this second adjusted position simply by pushing or pulling on handle assembly 4, the detents giving way to allow handle assembly 4 to move. Finally, forward stops or abutments defined by shoulders 60 are also included to provide a third adjusted position in which lower section 18 of handle assembly 4 extends forwardly on housing 10. All of these various adjusted positions are provided in simply formed handle retention brackets 24 which simply abut against handle tubes 6.

Referring to FIG. 6, the first pair of recesses 36, 38 that establish the first adjusted position relatively tightly constrain handle tubes 6 when handle tubes 6 are received therein. However, such recesses could be somewhat elongated between their forward and rearward edges so that a limited amount of rotational movement is allowed for handle assembly 4 when handle assembly 4 is in its first adjusted position (as shown in U.S. Pat. No. 3,527,469) without departing from the meaning or understanding that handle assembly 4 is still locked in that pair of recesses. Even if a small amount of rotation is allowed for handle assembly 4 within the first pair of recesses, handle tubes 6 are still constrained against moving out of the first pair of recesses until one handle tube 6 is physically disengaged from first recess 36.

Various modifications of this invention will be apparent to those skilled in the art. For example, it is not necessary that inwardly facing lips 34 be made as part of separate handle retention brackets that are then fixed to housing 10, but they could be integrally formed as part of housing 10 if so desired. Similarly, stub shafts 30 that pivotally journal handle assembly 4 on housing 10 could be elsewhere on some other part of housing 10. Accordingly, the scope of this invention is to be limited only by the appended claims.

We claim:

1. An outdoor power equipment unit, which comprises:

(a) a housing suited for movement over the ground;

(b) a handle assembly extending upwardly from the housing to allow an operator to hold the handle assembly and thereby guide the housing during its movement over the ground, the handle assembly including two transversely spaced, upwardly extending handle tubes;

(c) means for pivotally attaching the handle tubes to the housing such that the handle assembly can be rotated on the housing to adjust its position relative to the housing;

(d) a locking mechanism coacting between the housing and one of the handle tubes when the handle assembly is in a first adjusted position on the housing, wherein the locking mechanism has a first engaged position and a second disengaged position, wherein the locking mechanism precludes rotation of the handle assembly out of its first adjusted position in its first engaged position but allows rotation of the handle assembly out of its first adjusted position in its second disengaged position, wherein the locking mechanism is selectively operable by the operator to place the locking mechanism in its second disengaged position and thereby free the handle assembly for rotation; and (e) a detent coacting between the housing and the other handle tube when the handle assembly is in its first adjusted position, the detent being shaped to be overcome simply by rotating the handle assembly after the locking mechanism is first placed in its second disengaged position by the operator, and wherein the detent is flexibly carried on the housing such that the detent can flex away from the other handle tube during release of the other handle tube from the detent.

2. An outdoor power equipment unit as recited in claim 1, wherein the locking mechanism comprises a first recess on the housing, wherein the first recess is shaped to receive the one handle tube therein in an interference fit which can be overcome only by the operator physically moving the one handle tube generally perpendicularly relative to and out of the recess.

3. An outdoor power equipment unit as recited in claim 2, wherein the detent comprises a second recess on the housing, wherein the second recess is shaped to receive the other handle tube therein in a detent fit which can be overcome by rotating the other handle tube relative to the second recess.

4. An outdoor power equipment unit as recited in claim 3, wherein the first and second recesses are longitudinally aligned with and transversely spaced apart from one another on the housing.

5. An outdoor power equipment unit as recited in claim 3, wherein the first and second recesses are formed in opposed, inwardly facing lips carried on the housing.

6. An outdoor power equipment unit as recited in claim 5, wherein the lips are formed on upper portions of handle retention brackets fixed to the housing with each bracket being carried on one side of the housing.

7. An outdoor power equipment unit as recited in claim 6, further including means for allowing the upper portions of the handle retention brackets to flex transversely relative to one another.

8. An outdoor power equipment unit as recited in claim 7, wherein the handle tubes are outwardly biased relative to one another into an abutting engagement with the lips carried on the upper portions of the handle retention brackets.

9. An outdoor power equipment unit as recited in claim 1, further including means carried on the housing and coacting with the handle tubes for forming at least one additional adjusted position in which the handle assembly is rotated forwardly out of the first adjusted position.

10. An outdoor power equipment unit as recited in claim 9, wherein the handle assembly in its first adjusted position extends rearwardly from the housing for operation of the outdoor power equipment unit, and the handle assembly in its at least one additional adjusted position overlies the housing for storage of the outdoor power equipment unit.

11. An outdoor power equipment unit, which comprises:
 (a) a housing suited for movement over the ground;
 (b) a handle assembly extending upwardly from the housing to allow an operator to hold the handle assembly and thereby guide the housing during its movement over the ground, the handle assembly including first and second transversely spaced, upwardly extending handle tubes having flattened lower portions with straight edges;
 (c) means for pivotally attaching the flattened lower portions of the handle tubes to the housing such that the handle assembly can be rotated on the housing to adjust its position relative to the housing; and
 (d) means carried on the housing for locking the handle assembly in a first adjusted position on the housing, wherein the locking means includes first and second transversely spaced recesses which are positioned relative to the handle tubes such that each recess individually engages against a flattened lower portion of the first and second handle tubes, respectively, when the handle assembly is in the first adjusted position, wherein the first recess is shaped with a forward edge that extends substantially perpendicularly to the edges of the flattened lower portion of the first handle tube to lock the first handle tube in place on the housing to preclude rotation of the handle assembly until the first handle tube and the first recess are manually disengaged from one another by the operator, and wherein the second recess is configured with a forward edge that is inclined relative to the flattened lower portion of the second handle tube to form a detent with the second handle tube which detent is shaped to be overcome simply by rotating the handle assembly after the first handle tube is disengaged from the first recess, wherein the operator only has to manually disengage the first handle tube from the first recess to unlock the handle assembly for movement out of its first adjusted position on the housing.

12. An outdoor power equipment unit, which comprises:
 (a) a housing suited for movement over the ground;
 (b) a handle assembly which includes a pair of transversely spaced, elongated handle tubes that extend upwardly from either side of the housing; and
 (c) at least one set of handle retention recesses carried on the housing with one recess being located on each side of the housing, wherein the recesses are further positioned to engage against the handle tubes to define an adjusted position of the handle assembly, wherein the recesses are differently shaped with one recess being configured to provide a positive lock with its associated handle tube and the other recess forming a cam surface with its associated handle tube, whereby only the one handle tube has to be physically disengaged from the positive locking recess with motion of the handle tubes in at least one direction after such disengagement being sufficient in conjunction with the shape of the cam surface to cam the other handle tube out of the recess having the cam surface.

13. An outdoor power equipment unit as recited in claim 12, wherein the recesses are formed in opposed, inwardly facing lips carried on the housing.

14. An outdoor power equipment unit as recited in claim 13, wherein the lips are formed on upper portions of a pair of handle retention brackets fixed to the housing.

15. An outdoor power equipment unit as recited in claim 14, further including means for allowing the upper portions of the handle retention brackets to flex transversely relative to one another.

16. An outdoor power equipment unit as recited in claim 15, wherein the handle assembly has the handle tubes under tension such that the handle tubes are normally biased outwardly away from one another, such outward bias being sufficient to keep the handle tubes in abutting engagement with the inwardly facing lips carried on the handle retention brackets.

17. An outdoor power equipment unit as recited in claim 14, wherein the handle assembly has the handle tubes under tension such that the handle tubes are normally biased outwardly away from one another, such outward bias being sufficient to keep the handle tubes in abutting engagement with the inwardly facing lips carried on the handle retention brackets.

18. An outdoor power equipment unit, which comprises:
 (a) a housing suited for movement over the ground;
 (b) a handle assembly extending upwardly from the housing and pivotally attached to the housing such that the handle assembly can be rotated on the housing to adjust its position relative to the housing; and
 (c) means carried on the housing and coacting with the handle assembly for defining a storage position of the handle assembly in which the handle assembly extends generally vertically relative to and overlies the housing, the position defining means including detent means for holding the handle assembly against rotation in both forward and reverse directions while in its storage position.

19. An outdoor power equipment unit as recited in claim 18, wherein the means for holding the handle assembly against rotation in both forward and reverse direction forms detents with either side of the handle assembly when the handle assembly is in its storage position, the detents being shaped to be overcome by intentional rotation of the handle assembly in either direction of rotation.

20. An outdoor power equipment unit, which comprises:

(a) a housing suited for movement over the ground;

(b) a handle assembly extending upwardly from the housing and pivotally attached to the housing such that the handle assembly can be rotated on the housing to adjust its position relative to the housing; and (c) a storage recess carried on the housing with the storage recess having forward and rearward edges between which a portion of the handle assembly is received when the handle assembly is in a storage position, wherein the storage recess is located on the housing such that the storage position of the handle assembly is one in which the handle assembly extends generally vertically relative to and substantially overlies the housing, wherein the forward and rearward edges of the storage recess are both inclined relative to the handle assembly portion to form camming surfaces, wherein the inclinations of the forward and rearward edges are sufficient to hold the handle assembly in the storage position against rotation of the handle assembly in either direction but can be selectively overcome by intentional rotation of the handle assembly in either direction of rotation.

21. An outdoor power equipment unit as recited in claim 20, further including an operational recess carried on the housing with the handle assembly portion being received in the operational recess when the handle assembly is in an operational position, wherein the operational recess is located on the housing such that the operational position is one in which the handle assembly extends upwardly and rearwardly relative to the housing.

22. An outdoor power equipment unit as recited in claim 21, wherein the operational recess also includes forward and rearward edges between which the handle assembly portion is received when the handle assembly is in its operational position.

23. An outdoor power equipment unit as recited in claim 22, wherein at least the forward edge of the operational recess is substantially perpendicular to the handle assembly portion when the handle assembly portion is received between the forward and rearward edges of the operational recess to lock the handle assembly in its operational position, wherein the handle assembly portion and the forward edge of the operational recess are movable relative to one another to allow the handle assembly to be selectively disengaged from the forward edge of the operational recess to unlock the handle assembly from its operational position and to allow movement of the handle assembly into its storage position.

24. An outdoor power equipment unit, which comprises:

(a) a housing suited for movement over the ground;

(b) a handle assembly extending upwardly from the housing to allow an operator to hold the handle assembly and thereby guide the housing during its movement over the ground, the handle assembly including two transversely spaced, upwardly extending handle tubes;

(c) means for pivotally attaching the handle tubes to the housing such that the handle assembly can be rotated on the housing to adjust its position relative to the housing;

(d) a locking mechanism coacting between the housing and one of the handle tubes when the handle assembly is in a first adjusted position on the housing, wherein the locking mechanism has a first engaged position and a second disengaged position, wherein the locking mechanism precludes rotation of the handle assembly out of its first adjusted position in its first engaged position but allows rotation of the handle assembly out of its first adjusted position in its second disengaged position, wherein the locking mechanism is selectively operable by the operator to place the locking mechanism in its second disengaged position and thereby free the handle assembly for rotation, wherein the locking mechanism comprises a first recess on the housing, wherein the first recess is shaped to receive the one handle tube therein in an interference fit which can be overcome only by the operator physically moving the one handle tube generally perpendicularly relative to and out of the first recess;

(e) a detent coacting between the housing and the other handle tube when the handle assembly is in its first adjusted position, the detent being shaped to be overcome simply by rotating the handle assembly after the locking mechanism is first placed in its second disengaged position by the operator, wherein the detent comprises a second recess on the housing, wherein the second recess is shaped to receive the other handle tube therein in a detent fit which can be overcome by rotating the other handle tube relative to the second recess; and (f) wherein the first and second recesses are formed in opposed, inwardly facing lips carried on the housing, and wherein the handle tubes are outwardly biased relative to one another into an abutting engagement with the inwardly facing lips to keep the handle tubes firmly engaged with the first and second recesses.

* * * * *